United States Patent [19]

Ives et al.

[11] Patent Number: 5,287,295
[45] Date of Patent: Feb. 15, 1994

[54] METHOD AND APPARATUS FOR CALIBRATING AN ELECTRONIC COMPASS TO ACCOUNT FOR ALIGNMENT ERRORS IN THE COMPASS WINDINGS

[75] Inventors: Martin D. Ives, Lake Zurich; Elisha M. Kozikaro, Chicago, both of Ill.

[73] Assignee: Motorola, Schaumburg, Ill.

[21] Appl. No.: 707,716

[22] Filed: May 30, 1991

[51] Int. Cl.$^5$ ............................................. G01C 25/00
[52] U.S. Cl. ........................... 364/571.01; 364/457; 364/449; 364/571.05; 364/571.02; 324/202; 324/245; 324/247; 73/1 E; 33/335 R; 33/356; 33/357; 33/361
[58] Field of Search ................... 364/571.01, 457, 449, 364/560, 571.02, 571.05, 559; 33/356, 361, 357, 358, 359, 360, 355 R; 73/1 E; 324/146, 151 A, 151 R, 202, 245, 247

[56] References Cited

U.S. PATENT DOCUMENTS

| | | | |
|---|---|---|---|
| 3,991,361 | 11/1976 | Mattern et al. | 324/43 R |
| 4,611,293 | 9/1986 | Hatch et al. | 364/571 |
| 4,622,644 | 11/1986 | Hansen | 364/559 |
| 4,646,015 | 2/1987 | Phillips | 324/253 |
| 4,720,992 | 1/1988 | Hormel | 73/1 E |
| 4,738,031 | 4/1988 | Alberter et al. | 33/356 |
| 4,797,841 | 2/1989 | Hatch | 364/571.04 |
| 4,807,462 | 2/1989 | Al-Attar | 23/1 E |
| 4,852,012 | 7/1989 | Suyama | 364/449 |
| 4,989,333 | 2/1991 | Helldörfer et al. | 33/356 |
| 5,046,031 | 9/1991 | Wanous | 364/571.02 |
| 5,131,155 | 7/1992 | Takano et al. | 33/356 |
| 5,161,311 | 11/1992 | Esmer et al. | 33/356 |
| 5,165,269 | 11/1992 | Nguyen | 73/1 E |

OTHER PUBLICATIONS

"Automobile Navigation Using a Magnetic Flux-Gate Compass", Timothy J. Peters, *IEEE Transactions on Vehicular Technology*, vol. VT-35, No. 2, May 1986.

*Primary Examiner*—Jack B. Harvey
*Assistant Examiner*—Hal D. Wachsman
*Attorney, Agent, or Firm*—Phillip H. Melamed; John H. Moore

[57] ABSTRACT

An electronic compass (10) having at least two sense windings (11, 12) is mounted in a vehicle. The outputs (x(h), y(h)) of the windings are measured for a number of compass directions (headings). From this data an error difference angle ($\phi$), from a nominal angle, which actually exists between the output windings is calculated. Preferably a look-up table (21, 39) is created relating actual compass heading (h) to measured sense winding outputs by utilizing the calculated error difference angle ($\phi$). This table is then utilized for calculating actual compass heading based on actual measured sense winding outputs. The calculated error angle ($\phi$) can also be used to calibrate the compass without creating a look-up table. The calibrated compass compensates for misalignment of the sense windings and provides a more accurate electronic compass without requiring creating a calibration table by orienting the compass in a very large number of exactly known directions.

36 Claims, 4 Drawing Sheets

METHOD AND APPARATUS FOR CALIBRATING AN ELECTRONIC COMPASS TO ACCOUNT FOR ALIGNMENT ERRORS IN THE COMPASS WINDINGS

FIELD OF THE INVENTION

The present invention is related to the field of electronic compasses, and more particularly to the field of calibrating such electronic compasses having a plurality of sense windings.

BACKGROUND OF THE INVENTION

Prior electronic compasses having a plurality of sense windings are known. These compasses are typically referred to as flux gate compasses. Such compasses generally have two sense windings oriented in nominally orthogonal directions with respect to one another. The output voltage signals produced by these windings are then utilized to provide an indication of compass heading or direction wherein the terms "heading" and "direction" are used interchangeably herein. Theoretically, if the windings were perfectly orthogonally aligned, and if there were no disturbances to the earth's magnetic field, the outputs of the sense windings would, when plotted against each other on an x y coordinate system, result in a circle locus. However, due to various magnetic effects, the actual plot of the sense output winding outputs results in an elliptical path.

Some prior electronic compasses have recognized that an elliptical locus is provided for the outputs of the sense windings due to magnetic field disturbances. Some prior compasses have attempted to correct the compass headings provided by such compasses by calculating the ellipse center coordinates and the ellipse major and minor axis radii and using these calculated parameters to calibrate the compass. However, such systems assume that the sense windings are exactly orthogonally aligned and that therefore no additional compensation or correction is required. These prior compass systems just compensate in accordance with the calculated ellipse center coordinates and the ellipse radii since generally great care is put into manufacturing electronic compasses having windings which are substantially orthogonal to one another. However, there can be appreciable errors in the compass heading provided by an electronic compass due to any slight non-orthogonal alignment of the sense windings. Typically this type of error is not compensated for or is not sufficiently compensated for. The result is that these compasses are not suitable for providing very accurate navigation headings. This is especially significant when the compass is used for vehicle navigation and the vehicle is not traveling on predetermined roads, since then conventional map matching can't be used to correct the compass heading.

It is possible to calibrate a compass by creating an extensive calibrated look-up table by orienting the compass in a very large number of known directions and storing the outputs of the sense windings provided for each such known direction. However, such a technique is time consuming and requires orienting the compass in a very large number of exactly known directions and this is not practical. If only a few known directions are used to create such a table, a less accurate compass is provided which is susceptible to winding alignment errors.

SUMMARY OF THE INVENTION

In one embodiment of the present invention a calibrated compass is provided and a method for calibrating an electronic compass is disclosed. A compass is provided with at least two sense windings that are disposed at a known nominal angle plus a difference angle with respect to one another. Calibration apparatus is provided which implements the following mode of operation. Outputs of the sense windings provided for a number of compass headings are measured and stored. Then the difference angle is calculated by using the stored winding output and heading data. The calculated difference angle is then used to relate actual compass heading to the outputs of the sense windings. In this manner, a much more accurate electronic compass is provided which includes compensation for misalignment between the sense windings. This can be accomplished without requiring the setting up of a very large look-up table by orientating the compass in a very large number of accurately known heading directions and recording the winding outputs provided for each of the known directions.

BRIEF DESCRIPTION OF THE DRAWINGS

The present invention can be better understood by reference to the drawings in which.

DESCRIPTION OF THE PREFERRED EMBODIMENTS

Figure 1:
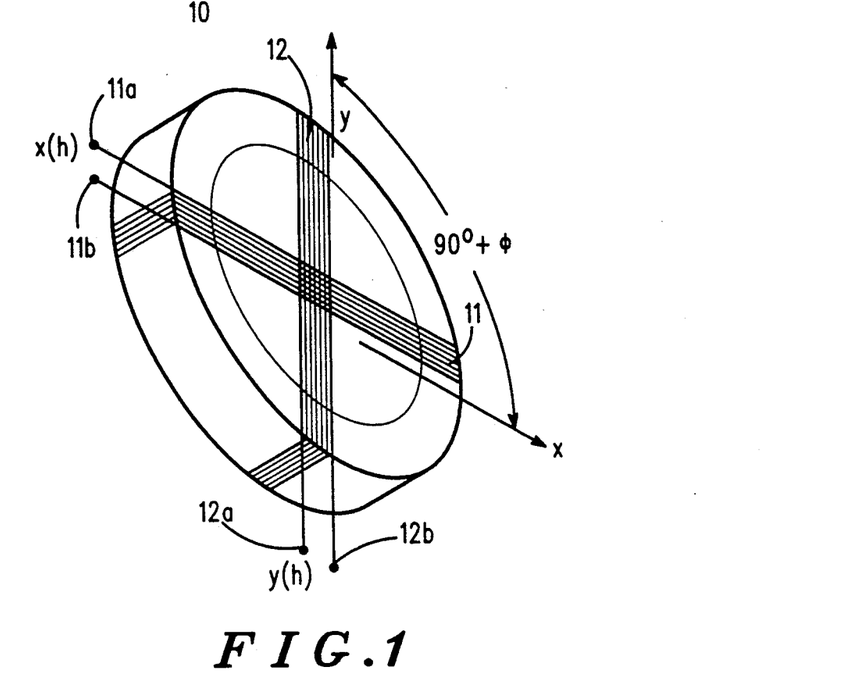
FIG. 1 is a perspective view of an electronic compass having two nominally orthogonal sense windings.

Referring now to FIG. 1 an electronic compass 10 is illustrated having an x sense winding 11 generally oriented in accordance with an X axis shown in FIG. 1 and a y sense winding 12 generally aligned in accordance with a Y axis shown in FIG. 1. Thus the windings are nominally orthogonally disposed with respect to each other. In response to sensed magnetism, each of the windings 11 and 12 produce across their respective output terminals $11_a$–$11_b$ and $12_a$–$12_b$ output voltages $x(h)$ and $y(h)$ wherein the letter designation h indicates that these signals are functions of compass sensed heading h. The construction of the magnetic compass 10 shown in FIG. 1 is conventional. However, it should be noted that the angle between the windings 11 and 12, while theoretically desired to be 90°, is actually 90° plus some non-orthogonal error difference angle $\phi$. This is because due to manufacturing tolerances it just is not possible to always ensure that the windings 11 and 12 are exactly orthogonal to one another. The existence of this error difference angle $\phi$ has generally been ignored in prior compass calibration systems, and this has resulted in those systems in being inaccurate. The present calibration apparatus described herein will actually calculate this error difference angle and then create a look-up table that allows compensation for it. Thus a much more accurate calibrated electronic compass apparatus is provided.

Figure 2:
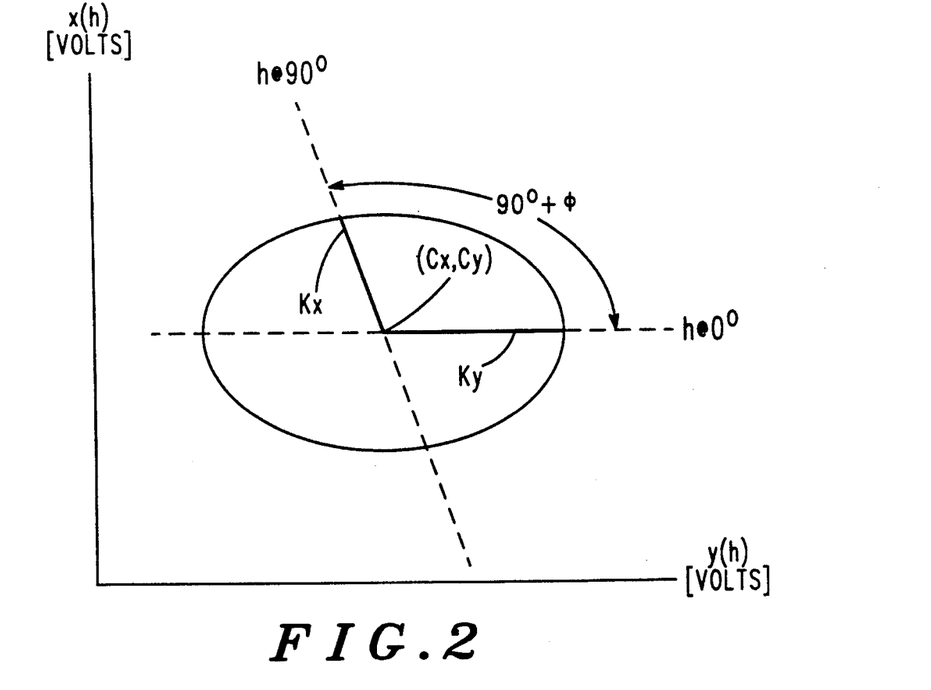
FIG. 2 is a graph of the locus of outputs of the sense windings in FIG. 1.

Referring now to FIG. 2, a plot of the locus of the outputs x(h) and y(h), plotted against each other, is illustrated for the case in which there is an appreciable error difference angle $\phi$. If there was no error difference angle $\phi$, many prior systems have recognized that the locus shown in FIG. 2 will comprise an ellipse. With the existence of the error difference angle $\phi$, the locus is still an ellipse but the non-orthogonality of the major and minor axes of the ellipse is now apparent. The ellipse will have center coordinates $C_x$ and $C_y$ and will have X and Y radii $K_x$ and $K_y$. The major Y axis radius $K_y$ is shown as coincident with an actual compass heading of 0° and the $K_x$ radius is shown as corresponding to an actual compass heading of 90°.

In general, it is know that plotting of the x and y winding outputs of an electronic compass will, under known real conditions which include the presence of some residual magnetism and some distortion of the earth's magnetic field, result in an ellipse as shown in FIG. 2. The general equations for such an ellipse are given by the following equations wherein the various constants C and K are different for each of the x y output windings 11 and 12.

$$x(h) = C_x + K_x \sin(h) \quad (1)$$

$$y(h) = C_y + K_y \cos(h) \quad (2)$$

In the above equations, h represents the absolute heading of the electronic compass with respect to magnetic north of the earth's magnetic field, and the values of x(h) and y(h) are in volts. In order to solve for the heading h, first you must solve the above equations for all of the constants $C_x$, $C_y$, $K_x$, and $K_y$ each of which is shown in FIG. 2. From FIG. 2 it can be seen that the constants $C_x$ and $C_y$ correspond to the center of the calibration ellipse shown in FIG. 2, and $K_x$ is the radius at h = 90° and $K_y$ is the radius at h = 0°. Under ideal conditions, the magnetic sense windings 11 and 12 are orthogonal and therefore the non-orthogonal error difference angle $\phi$ is zero. In this case, the equations 1 and 2 would result in the following equation for h with h expressed in degrees.

$$h = \arctan\left[\frac{(x(h) - C_x) K_y}{(y(h) - C_y) K_x}\right] \quad (3)$$

Thus given the measured values of x(h) and y(h) and the constants $C_x$, $C_y$, $K_x$, and $K_y$, h can be calculated from equation (3).

However, in general the magnetic sense windings 11 and 12 of the compass 10 are not orthogonally disposed with respect to one another. Thus the error difference angle $\phi$ is not equal to 0° and the h = 0° and h = 90° axes are not perpendicular to one another. This therefore indicates that equations 1 and 2 do not properly describe the locus for the outputs of the windings 11 and 12 when the windings are not orthogonal. Therefore, to accommodate this situation the following equations more closely approximate the situation.

$$x(h) = C_x + K_x \sin(h + \phi) \quad (4)$$

$$y(h) = C_y + K_y \cos(h) \quad (5)$$

Note that in the equations 4 and 5 the error difference angle $\phi$ is only included in the x(h) function, since otherwise the equations 4 and 5 would illustrate an orthogonal relationship between the windings 11 and 12. The present apparatus will calculate the value of this error difference angle $\phi$ and create a look-up table so that for measured output values of the windings 11 and 12 a corrected calibrated heading for the compass 10 can be provided. This is accomplished in the following manner.

Figures 3, 5:
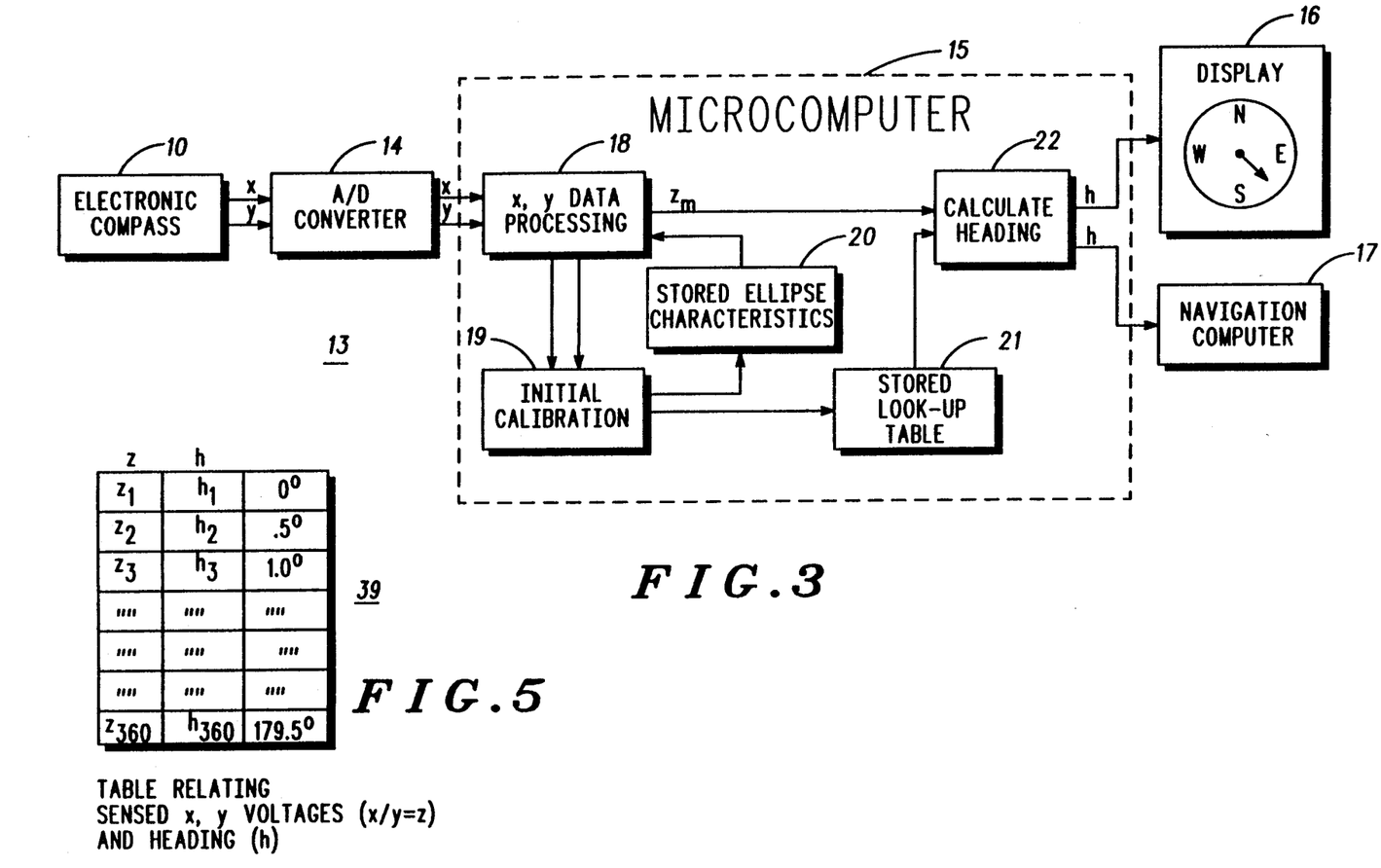
FIG. 3 is an electrical schematic block diagram of a calibrated compass which uses the compass shown in FIG. 1.
FIG. 5 illustrates a look-up table created by the apparatus shown in FIG. 3.

Referring to FIG. 3, a compass calibration apparatus 13 is illustrated wherein all of the apparatus 13 is intended for installation in a vehicle (not shown) such as an automobile. The calibration apparatus 13 includes the electronic compass 10 which is shown in block form in FIG. 3. In FIG. 3 the compass 10 is shown as providing x y outputs, from the windings 11 and 12, respectively, to an A to D converter 14 which provides digital versions of these signals as inputs to a microcomputer 15 (shown dashed).

The microcomputer 15 essentially creates calibration data via an initial calibration subroutine and then utilizes subsequent measured winding output data provided by the compass 10 to calculate an actual vehicle heading by means of the calibration data previously created. The end result is the providing of accurate heading data to both a visual display 16 and a navigation computer 17 wherein both of the devices 16 and 17 utilize the heading information provided thereto. The reason FIG. 3 shows two separate paths for the heading information provided to the devices 16 and 17 is that the heading information may be provided in different formats to each of these devices for better utilization by the devices. In other words, the device 16 may receive direct visual display drive signals containing the vehicle heading information, whereas the heading information sent to the navigation computer 17 may be in a different format. Various blocks are shown within the microcomputer 15 and represent various major programming functions preprogrammed into the microcomputer. These will now be briefly discussed in connection with FIG. 3 and then will be discussed in more detail with regard to the more detailed flowcharts shown in FIGS. 4 and 6 and the look-up table shown in FIG. 5.

Referring to FIG. 3, the x y data from the A to D converter 14 is initially received in the microcomputer 15 by an x y data processing block 18. Initially, the processing block 18 will supply processed data to an initial calibration block 19 which calculates and stores characteristics of the ellipse locus shown in FIG. 2 in a storage location 20. These stored ellipse characteristics comprise the coordinates of the center of the ellipse and the major and minor axis radii of the ellipse. These characteristics are provided as inputs to the processing block 18 for further use by this block during subsequent determination of vehicle heading. The initial calibration block 19 also creates a stored look-up table 21 shown in FIG. 3. The stored look-up table 21 in FIG. 3 is used as an input to a calculate heading process block 22 shown in FIG. 3 which also receives a quantity $z_m$ to be provided by the x y data processing block 18. Essentially, the microcomputer 15 goes through an initial Calibration subroutine that calculates characteristics of the ellipse and stores them for subsequent use. It also creates a stored look-up table. The look-up table is created by first calculating non-orthogonal error difference angle $\phi$ and using this angle to create the stored look-up table. Then the stored look-up table and the parameter $z_m$ are utilized by the process block 22 to calculate the actual heading of a vehicle based on the electronic compass outputs of winding 11 and 12. This actual heading is then provided to the devices 16 and 17. This operation is best understood by reference to the more detailed flowcharts shown in FIGS. 4 and 6 which can be readily implemented by conventional computer programming.

Figure 4:
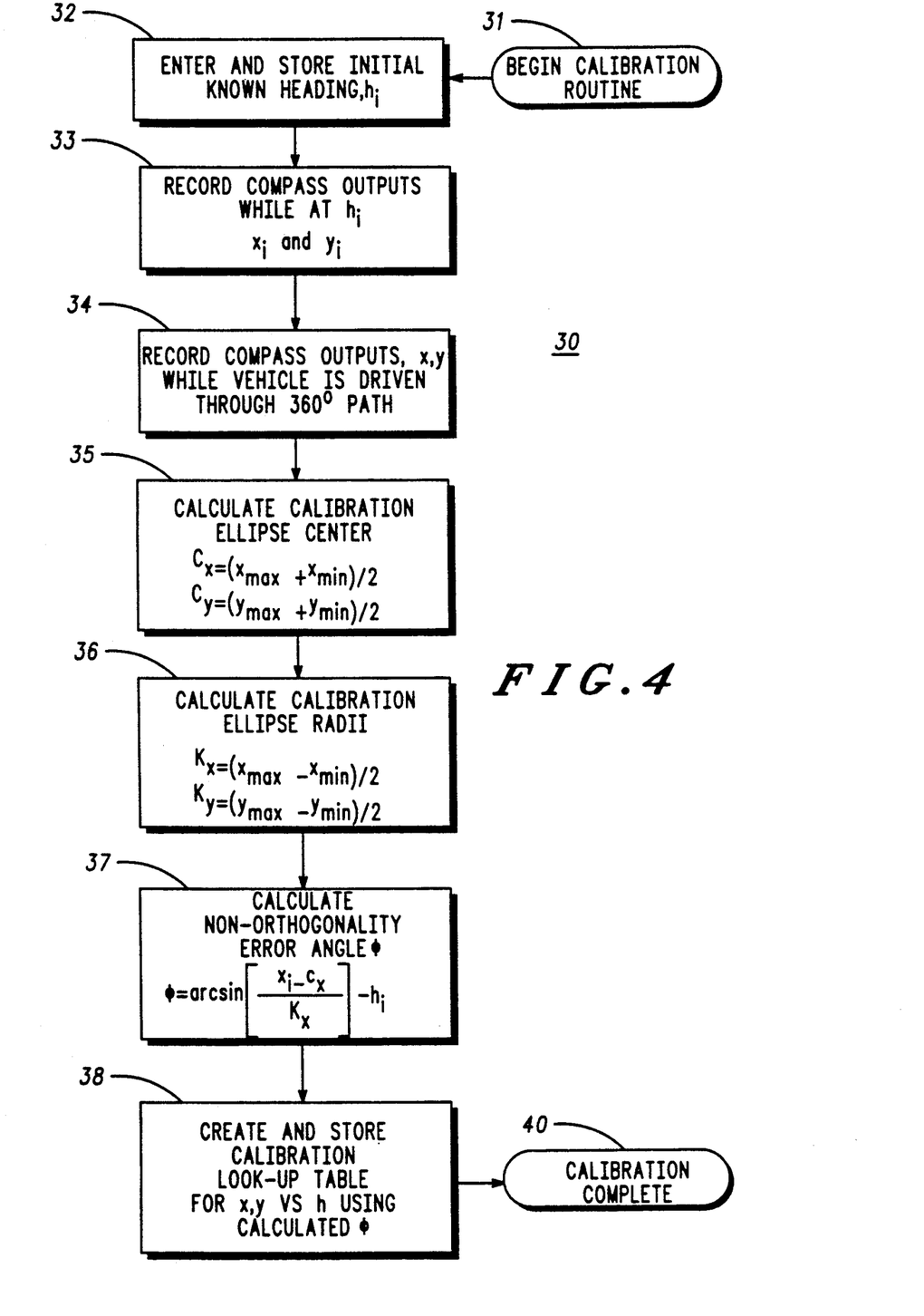
FIG. 4 is a flowchart for a calibration routine implemented b apparatus in FIG. 3.

Referring to FIG. 4, a flowchart 30 is illustrated which represents an initial calibration routine implemented when the microcomputer 15 receives electronic compass data and is told, by some implementation command, to implement a calibration routine. This calibration routine can be implemented periodically upon the timing out of some preset timer or it can be implemented in accordance with vehicle operator actuation of some control.

An initial step 31 signifies the entering or beginning of the calibration routine. Subsequently, the vehicle is positioned in a known direction $h_i$ and at the same time this known direction is entered into the microcomputer 15 either directly by the vehicle operator or by some apparatus. This step is generally designated as block 32. At this time, according to block 33, the readings of the compass output windings 11 and 12 are recorded while the vehicle is directed in the direction $h_i$. Then the vehicle is driven in a 360° circular path and the outputs x(h), y(h) of the windings 11 and 12 are periodically recorded so as to determine the maximum and minimum outputs of each of the windings 11 and 12. This is represented by block 34. Utilizing these maximum and minimum data, process block 35 calculates the coordinates $C_x$, $C_y$ of the center of the ellipse shown in FIG. 2, and process block 36 calculates the radii $K_x$, $K_y$ of the ellipse. Several prior systems utilize this technique in calculating the center coordinates and radii of a calibration ellipse representative of the output of a magnetic compass. Other techniques could also be used to calculate these ellipse characteristics such as using the data taken during a 360° turn to fit an ellipse curve to the data and then calculating the ellipse center and radii. Typically, then the prior systems proceed to ignore the fact that there may be some non-orthogonality between the compass windings. Thus these prior systems typically utilize equation 3 to then calculate vehicle heading based upon the subsequent measured outputs of the compass windings 11 and 12.

According to FIG. 4, the next step of the present calibration routine 30 is the calculation of the non-orthogonal error difference angle $\phi$ by process block 37. This is implemented in accordance with equation 6 reproduced below. Equation 6 is derived from equation 4 after substituting the initial heading value $h_i$ and its corresponding x(h) winding output $x_i$ provided by winding 11.

$$\phi = \arcsin[(x_i - C_x)/K_x] - h_i \tag{6}$$

Since the arcsin function in equation 6 just provides angles from 270° to 90°, a quadrant check must be performed to include the range from 90° to 270°. This quadrant check essentially involves determining if the quantity $y_i - C_y$ is greater than 0, thus indicating a 270° to 90° range, or less than 0, indicating a 90° to 270° range.

After the calculation of the non-orthogonal error difference angle $\phi$, flowchart 30, via process block 38, preferably creates and stores a calibration look-up table relating the outputs x(h) and y(h) of the windings 11 and 12 versus the heading h wherein this table is calculated using the error difference angle $\phi$. This is accomplished in the following manner and essentially results in utilizing the equations 4 and 5, and the error difference angle $\phi$ and ellipse characteristics (center coordinates and radii), to calculate the heading h from measured values of the outputs of the sense windings 11 and 12.

Equations 4 and 5 can be simplified by utilizing the parameters x'(h) and y'(h) as follows:

$$x'(h) = \sin(h + \phi) \tag{7}$$

$$y'(h) = \cos(h) \tag{8}$$

Where:

$$x'(h) = \frac{x(h) - C_x}{K_x} \tag{9}$$

$$y'(h) = \frac{y(h) - C_y}{K_y} \tag{10}$$

Now, by defining z as equation (7) divided by equation (8), we get:

$$z = \frac{x'(h)}{y'(h)} \tag{11}$$

Therefore:

$$z = \frac{\sin(h + \phi)}{\cos(h)} \tag{12}$$

Based upon the above equation 12, a look-up table 39 shown in FIG. 5 is generated and stored. The table 39 corresponds to table 21 in FIG. 3 and is a two column table of the parameter z verses h. The table is created by using equation 12, substituting the calculated value of $\phi$ into the equation, incrementing the heading h through 360½ degree steps, and calculating the parameter z. The 360 equal steps of assumed headings $h_1$ through $h_{360}$ correspond to ½ degree heading steps from a heading of 0° to a heading of 179.5° (approximately 180°). These heading steps, along with the error difference angle $\phi$, are substituted into equation 12 to produce a corresponding group of z parameter values $z_1$ through $z_{360}$. After the creation of this look-up table, calibration routine 30 then ends at step 40. It should be noted that the parameter z is actually a ratio of the corrected or adjusted winding output signals x'(h) and y'(h) which are determined by the x(h) and y(h) outputs of the windings 11 and 12. This can be seen by reviewing equation 11 and equations 9 and 10.

During subsequent actual calculation of vehicle heading, the calibration apparatus 13 in FIG. 3 will essentially utilize the calibration table 39 for calculating heading based on the measured sense winding outputs of the windings 11 and 12. This utilization of the look-up table will now compensate for the non-orthogonal error difference angle $\phi$. This is accomplished in accordance with the flowchart shown in FIG. 6.

Figure 6:
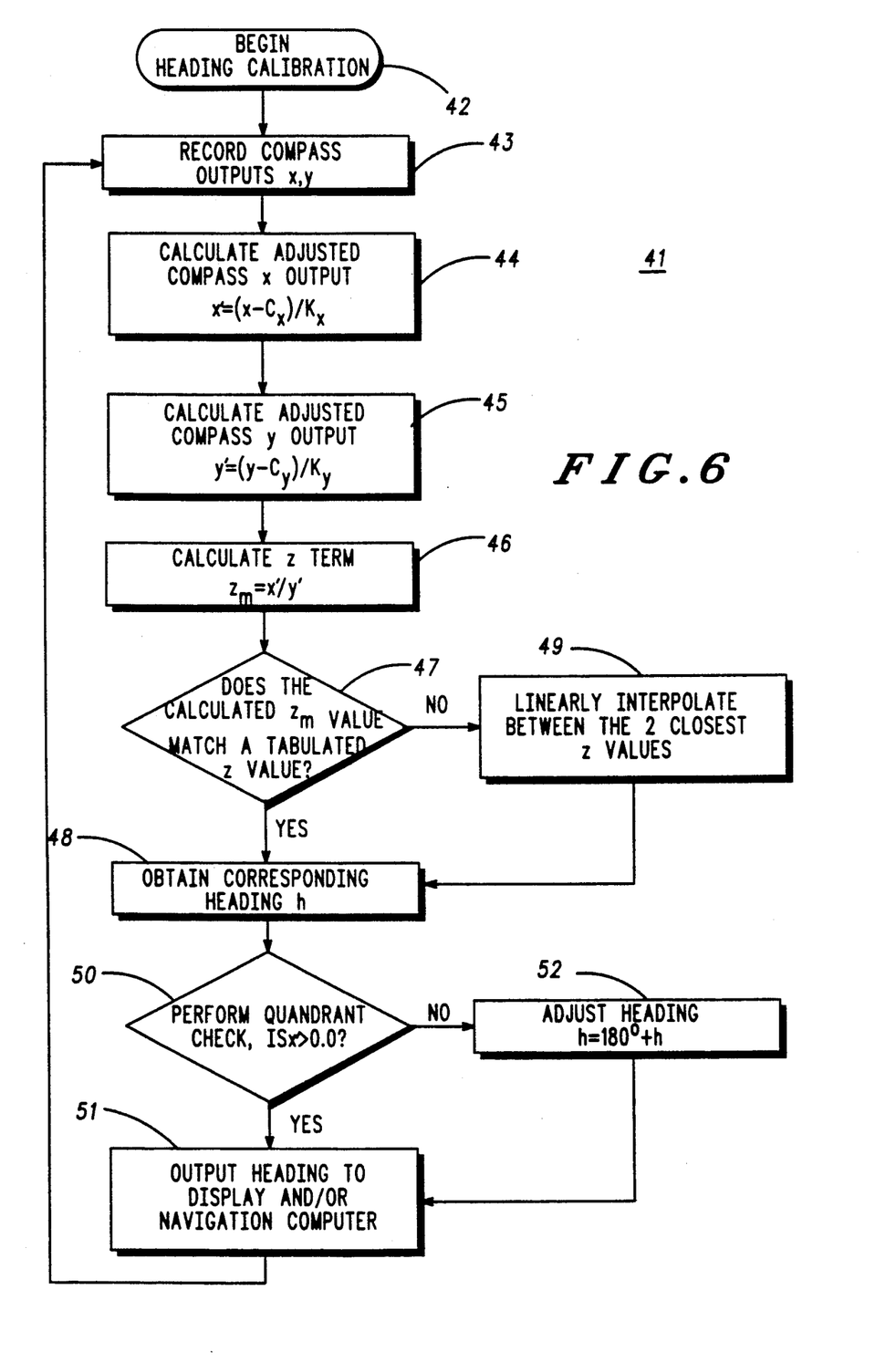
FIG. 6 is a flowchart illustrating the operation of the apparatus in FIG. 3 in utilizing the look-up table shown in FIG. 5 to obtain a vehicle heading.

Referring to FIG. 6, a flowchart 41 is illustrated showing how the calibration apparatus 13 utilizes the stored look-up table 39 to calculate actual vehicle heading values by compensating for the non-orthogonality of the compass windings 11 and 12. This is accomplished as follows. The flowchart 41 is entered at an initial step 42. Then a step 43 records the current measured outputs x(h), y(h) of the compass windings 11 and 12. Then subsequent steps 44 and 45 calculate adjusted or corrected compass outputs x'(h), y'(h) by taking into account the previously calculated the center coordinates of the calibration ellipse and the major and minor axis radii of the calibration ellipse. These previously calculated parameters correspond to the terms $C_x$, $C_y$, $K_x$, and $K_y$ which were calculated by flowchart 30 and stored in computer location 20 in FIG. 3. Then a step 46 calculates the actual measured ratio term $z_m$ which is the ratio of the adjusted or corrected measured values x'(h), y'(h) wherein the corrected measured values are designated by prime notation.

After step 46, control passes to decision block 47 which asks if the calculated measured ratio value $z_m$ exactly matches one of the tabulated z values in the table 39. If so, then the corresponding heading h is merely read off of the table 39 by process step 48. If not, a process step 49 will linearly interpolate between the two closest z values around the measured ratio value $z_m$ and the result of this linear interpretation is then provided by the step 49 to the step 48. The end result is that after the step 48, the calibration table 39 has been utilized to determine an accurate heading direction h.

Since the table 39 just provides for headings between 0 and 179.5°, there is a 180° ambiguity regarding this heading. This is resolved by decision block 50 which inquires if the corrected winding 12 output x' is greater than 0. If so, then it is clear that the heading angle h provided by the table 39 is the actual vehicle heading and a process block 51 provides this heading to the display 16 and/or navigation computer 17 shown in FIG. 1. If the magnitude of the corrected winding 12 output x' is not greater than 0, then control passes from block 50 to a process block 52 that corrects the heading from table 39 by 180°. Then the corrected heading is provided to the process block 51 which provides the heading information to the display and navigation computer. The table 39 only provides readings from 0 to 179.5° to minimize its size, since decision block 50 illustrates how to use a quadrant check of the polarity of the adjusted signal x' to determine heading directions from 180° to 359.5°.

In FIG. 6, the flowchart 41 is shown as comprising a loop since after the process block 51, control recirculates back to the process block 43 for a next reading of the outputs of the compass windings 11 and 12. In this manner, the measured vehicle compass reading is continually updated.

Basically, the calibration apparatus 13 has utilized data provided by the compass windings 11 and 12 to calculate the actual difference angle that exists between these windings in addition to the nominal 90° angle spacing which was intended to exist between these windings. Thus the difference angle $\phi$ is calculated which represents the error difference angle from orthogonality between the two windings. No prior system appears to calculate this orthogonal error angle, and therefore no prior system suggests using this calculated error angle to then calibrate the electronic compass to obtain a more accurate reading therefrom. In the apparatus 13, this error difference angle is preferably utilized to create a look-up table which then allows subsequent measured values of the sense winding outputs to be effectively calibrated to produce a correct vehicle heading. When vehicle navigation is conducted in off road conditions, such as in a parking lot or a desert area, even small errors in sensed vehicle heading can be significant and the present invention minimizes such errors by its calibration of the electronic compass.

While we have shown and described specific embodiments of this invention, further modifications and improvements will occur to those skilled in the art. For example, instead of using a two winding flux gate compass having windings disposed orthogonal to one another, a three winding flux gate compass utilizing three windings nominally spaced at 120° intervals could be utilized. In addition, instead of constructing a look-up table by utilization of equation 12, the equation 12 could be used directly by a computer to compute the actual heading h whenever a calculated ratio $z_m$ was substituted for the value z in this equation and the difference angle $\phi$, which was calculated by the calibration subroutine 30, was substituted for in equation 12. All such modifications which retain the basic underlying principles disclosed and claimed herein are within the scope of this invention.

What is claimed is:

1. A method for calibrating an electronic compass comprising the steps of:
providing an electronic compass having at least two sense windings disposed at a known nominal angle plus a difference angle with respect to one another;
measuring and storing, as data outputs of the sense windings; outputs of the sense windings provided for a number of compass headings;
calculating the difference angle between the sense windings; by using the stored winding output and heading data; and
using said calculated difference angle to relate actual compass heading to outputs of said sense windings.

2. A method according to claim 1 wherein said measuring and storing step comprises the steps of orienting the electronic compass in a known initial heading direction, measuring and storing at least one output of the sense windings provided for the known initial heading direction, and measuring and storing the outputs of the sense windings provided for a number of other compass headings.

3. A method according to claim 2 wherein said calculating step includes the steps of calculating at least one coordinate of a center and at least one radii of an ellipse formed by a locus of said stored outputs of each of said sense windings plotted against one another, and calculating said difference angle by using the calculated ellipse center and radii data and the known initial heading direction and the stored corresponding output winding data provided for the known initial heading direction.

4. A method according to claim 3 wherein said known nominal angle is 90°.

5. A method according to claim 1 wherein said using step includes the step of creating a look-up table relating actual compass heading to the outputs of said sense windings by using said calculated difference angle.

6. A method according to claim 5 wherein said step of creating said look-up table comprises calculating and storing a ratio value z by dividing sine and cosine functions of a heading angle h and the heading angle h corrected by said calculated difference angle.

7. A method according to claim 6 wherein said look-up table correlates a range of heading values h in equal increment steps from 0° to approximately 180° to a plurality of corresponding ratio values z.

8. A method according to claim 7 wherein said using step includes the step of correcting said outputs of said sense windings by said calculated ellipse center data and said calculated ellipse radii data to provide corrected output data and the ratio of said corrected output data is used to create a measurement ratio $z_m$, and wherein actual compass heading is derived by using said look-up table to calculate the heading corresponding to the measurement ratio $z_m$ by comparing the measurement ratio $z_m$ with the stored ratio values z in the look-up table to determine the corresponding heading value.

9. A method according to claim 1 wherein said sense windings of said electronic compass are fixed with respect to one another and wherein said compass, prior to said measuring and storing, and calculating steps, is mounted in a vehicle whose heading direction is to be sensed.

10. A method according to claim 9 wherein said step of measuring and storing the outputs of the sense windings for a number of headings is implemented by driving said vehicle in a circle after orienting said vehicle in a known initial direction.

11. A method according to claim 3 wherein said step of calculating said center and radii of the ellipse is implemented by storing maximum and minimum values for the outputs of each of said sense windings and utilizing these maximum and minimum values to calculate at least one ellipse center coordinate and at least one ellipse radii.

12. A method for calibrating an electronic compass comprising the steps of:
 (a) providing an electronic compass having x and y sense windings disposed nominally orthogonal with respect to one another;
 (b) orienting the electronic compass in an initial known heading direction ($h_i$);
 (c) measuring and storing as data at least one output of the sense windings provided for the known initial heading direction;
 (d) measuring and storing, as data outputs of the sense windings, outputs of the sense windings provided for a number of other compass headings;
 (e) calculating at least one coordinate of the center and at least one radii of an ellipse formed by a locus of said stored outputs of each of said sense windings plotted against one another;
 (f) calculating a non-orthogonal error difference angle ($\phi$) between the sense windings by using the calculated center and radii data and the initial heading and initial output winding data; and
 (g) creating and storing a look-up table relating actual compass heading to the outputs of sense windings by using said calculated error difference angle;
 whereby said look-up table can be used for calibrating the compass to compensate for non-orthogonal alignments of the sense windings.

13. A method according to claim 12 which includes a subsequent and additional step of using said table for calculating actual compass heading based on outputs of said sense windings.

14. A method according to claim 13 wherein said step of creating said look-up table comprises calculating a ratio value z by dividing sine and cosine functions of a heading angle h and the heading angle h corrected by said non-orthogonal error difference angle ($\phi$).

15. A method according to claim 14 wherein said look-up table correlates a range of heading values h in equal increment steps from 0° to approximately 180° to a plurality of corresponding ratio values z.

16. A method according to claim 15 wherein said using step includes the step of correcting said outputs of said x and y sense windings by said calculated ellipse center and said calculated ellipse radii data to provide corrected output data and the ratio of said corrected output data is used to create a measurement ratio $z_m$, and wherein actual compass heading is derived by using said look-up table to calculate the heading corresponding to the measurement ratio $z_m$ by comparing the measurement ratio $z_m$ with the stored ratio values z in the table to determine the corresponding heading value.

17. A method according to claim 12 wherein said x and y sense windings of said compass are fixed with respect to one another and wherein said compass, prior to said measuring and calculating steps, is mounted in a vehicle whose heading direction is to be sensed.

18. A method according to claim 17 wherein said step of measuring and storing the outputs of the windings for a number of headings is implemented by driving said vehicle in a circle after orienting said vehicle in said known heading direction ($h_i$).

19. A method according to claim 12 wherein said step of calculating said center and radii of the ellipse is implemented by storing maximum and minimum values for the outputs of each of said sense windings x and y and utilizing these maximum and minimum values to calculate at least one ellipse center coordinate and at least one ellipse radii.

20. A calibrated electronic compass comprising:
 an electronic compass having at least two sense windings disposed at a known nominal angle plus a difference angle with respect to one another;
 means for measuring and storing, as data outputs of the sense windings, outputs of the sense windings provided for a number of compass headings;
 means for calculating the difference angle between the sense windings by using the stored winding output and heading data; and
 means for using said calculated difference angle to relate actual compass heading to outputs of said sense windings.

21. A calibrated electronic compass according to claim 20 wherein.. said measuring means comprises means for measuring and storing at least one output of the sense windings provided for a known initial heading direction of the compass, and means for measuring and storing the outputs of the sense windings provided for a number of other compass headings.

22. A calibrated electronic compass according to claim 21 wherein said calculating means includes means for calculating at least one coordinate of a center and at least one radii of an ellipse formed by a locus of said stored outputs of each said sense windings plotted against one another, and means for calculating said difference angle by using the calculated ellipse center and radii data and the initial heading and corresponding initial output winding data.

23. A calibrated electronic compass according to claim 22 wherein said known nominal angle is 90°.

24. A calibrated compass according to claim 20 wherein said using means includes means for creating a look-up table relating actual compass heading to the outputs of said sense windings by using said calculated difference angle.

25. A calibrated compass according to claim 24 wherein said means for creating said look-up table comprises means for calculating a ratio value z by dividing sine and cosine functions of a heading angle and the same heading angle corrected by said calculated difference angle.

26. A calibrated compass according to claim 25 wherein said table correlates a range of heading values h in equal increment steps from 0° to approximately 180° to a plurality of corresponding ratio values z.

27. A calibrated compass according to claim 26 wherein said using means includes means for correcting said outputs of said windings by said calculated ellipse center data and said calculated ellipse radii data to provide corrected output data and said compass including means for creating a measurement ratio $z_m$ from a ratio of said corrected output data, and means for deriving actual compass heading by using said look-up table to calculate the heading corresponding to the measurement ratio $z_m$ by comparing the measurement ratio $z_m$ with the stored ratio values z in the table to determine the corresponding heading value.

28. A calibrated compass according to claim 20 wherein said sense windings of said compass are fixed with respect to one and another and wherein said compass is mounted in a vehicle whose heading direction is to be sensed.

29. A calibrated compass according to claim 28 wherein said means for measuring and storing the outputs of the sense windings for a number of headings measures and stores such outputs during driving said vehicle in a circle after orienting said vehicle in a known initial direction.

30. A calibrated compass according to claim 22 wherein said means for calculating said center and radii of the ellipse stores maximum and minimum values for the outputs of each of said windings and utilizes these maximum and minimum values to calculate at least one ellipse center coordinate and at least one ellipse radii.

31. A calibrated electronic compass comprising:
(a) an electronic compass having x and y sense windings disposed nominally orthogonal with respect to one another;
(b) means for measuring and storing as data at least one output of the sense windings provided for a known initial heading direction of said electronic compass;
(c) means for measuring and storing, as data outputs of the sense windings, outputs of the sense windings provided for a number of other compass headings;
(d) means for calculating at least one coordinate of the center and at least one radii of an ellipse formed by the locus of said stored outputs of each of said sense windings plotted against each other;
(e) means for calculating a non-orthogonal error difference angle ($\phi$) between the windings by using the calculated center and radii data and the initial heading and initial output winding data; and
(f) means for creating and storing a look-up table relating actual compass heading to the outputs of sense windings by using said calculated error difference angle;
whereby said look-up table can be used for calibrating the electronic compass to compensate for non-orthogonal alignment of the windings.

32. A calibrated compass according to claim 31 which includes means for using said look-up table for calculating actual compass heading based on outputs of said sense windings.

33. A calibrated compass according to claim 32 wherein said means for creating said look-up table comprises means for calculating a ratio value z by dividing sine and cosine functions of a heading angle h and the heading angle h corrected by said non-orthogonal error difference angle ($\phi$).

34. A calibrated compass according to claim 33 wherein said look-up table correlates a range of heading values h in equal increment steps from 0° to approximately 180° to a plurality of corresponding ratio values z.

35. A calibrated compass according to claim 34 wherein said using means includes the means for correcting said outputs of said x and y sense windings by said calculated ellipse center and said calculated ellipse radii data to provide corrected output data, and said calibrated compass including means for creating a measurement ratio $z_m$ by using a ratio of said corrected output data, and means for deriving actual compass heading by using said look-up table to calculate the heading corresponding to the measurement ratio $z_m$ by comparing the measurement ratio $z_m$ with the stored ratio values z in the look-up table to determine the corresponding stored heading value.

36. A calibrated compass according to claim 31 wherein said means for calculating said center and radii of the ellipse includes means for storing maximum and minimum values for the outputs of each of said windings x and y and utilizing these maximum and minimum values to calculate at least one ellipse center coordinate and at least one ellipse radii.

* * * * *